United States Patent
Maeda et al.

(10) Patent No.: US 8,150,079 B2
(45) Date of Patent: Apr. 3, 2012

(54) PERSONAL DIGITAL ASSISTANT AND STEREO REPRODUCTION METHOD

(75) Inventors: Kazuhiro Maeda, Yokohama (JP); Tamotsu Ito, Ayase (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1384 days.

(21) Appl. No.: 11/302,808

(22) Filed: Dec. 14, 2005

(65) Prior Publication Data

US 2006/0161278 A1  Jul. 20, 2006

(30) Foreign Application Priority Data

Dec. 17, 2004  (JP) .................. 2004-366422

(51) Int. Cl.
H04R 5/02 (2006.01)
(52) U.S. Cl. ............. 381/306; 700/94; 700/300
(58) Field of Classification Search ............. 381/1, 300, 381/309, 306, 81, 85, 123, 322, 332, 333, 381/388, 386, 334, 27; 361/679.29, 679.3, 361/679.56, 679.23; 700/94; 455/556.2; 345/158, 169
See application file for complete search history.

(56) References Cited

U.S. PATENT DOCUMENTS 7,353,049 B2 * 4/2008 Mizuta .................. 455/575.3
2005/0122311 A1 * 6/2005 Lee et al. .................. 345/158

FOREIGN PATENT DOCUMENTS

| JP | 08-084286 | | 3/1996 |
|---|---|---|---|
| JP | 09-034353 | | 2/1997 |
| JP | 10-336787 | | 12/1998 |
| JP | 2001-309274 | * | 11/2001 |
| JP | 2003-078601 | | 3/2003 |
| JP | 2003-244786 | * | 8/2003 |
| JP | 2004-032352 | | 1/2004 |

OTHER PUBLICATIONS

Office Action dated May 23, 2008 issued for the counterpart Japanese Patent Application No. 2004-366422, (2 pgs.).

* cited by examiner

Primary Examiner — Xu Mei
Assistant Examiner — Lao Lun-See
(74) Attorney, Agent, or Firm — Cozen O'Connor

(57) ABSTRACT

An operation section housing and a display section housing are connected by a rotatable hinge having a structure in which the display section housing rotates with the rotatable hinge serving as the central rotational axis. The display section housing has three built-in speakers in predetermined positions of a display. A personal digital assistant detects the angle of the rotatable hinge and identifies the speaker located in the leftmost side and the speaker located in the rightmost side relative to an upright display image displayed on the display. Then, the left audio is output from the left side of the upright display image and the right audio is output from the right side of the upright display image.

17 Claims, 8 Drawing Sheets

FIG. 4

| STATE | LEFTMOST SPEAKER | RIGHTMOST SPEAKER |
|---|---|---|
| FIG. 1A | 105 | 106 |
| FIG. 1B | 105 | 107 |
| FIG. 1C | 105 | 107 |
| FIG. 1D | 106 | 107 |
| FIG. 1E | 106 | 105 |
| FIG. 1F | 107 | 105 |
| FIG. 1G | 107 | 105 |
| FIG. 1H | 107 | 106 |

FIG. 8A
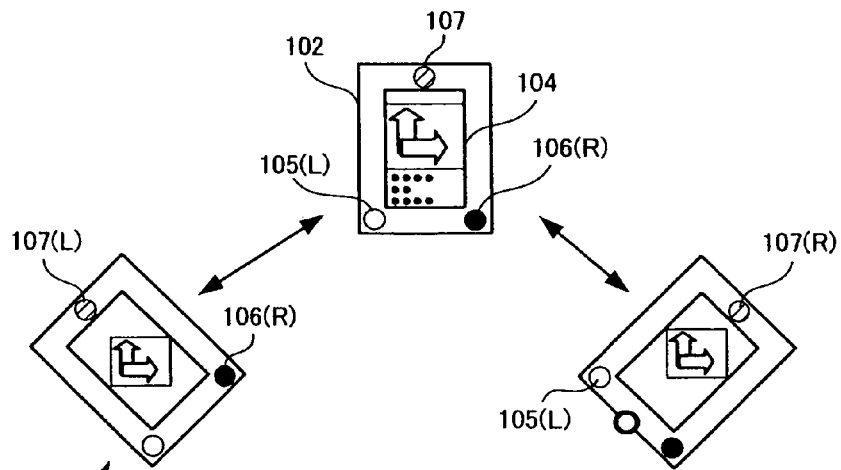
FIG. 8H    FIG. 8B
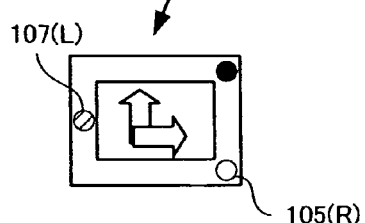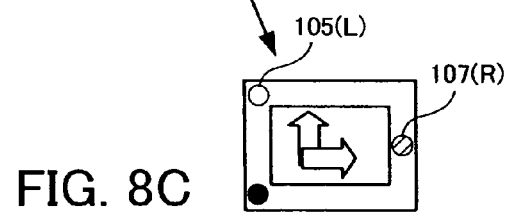
FIG. 8G    FIG. 8C
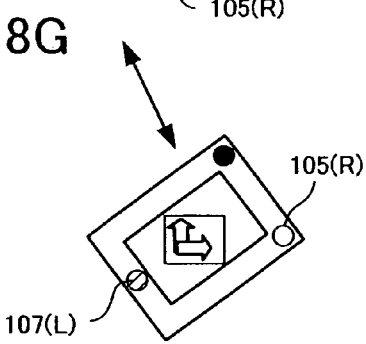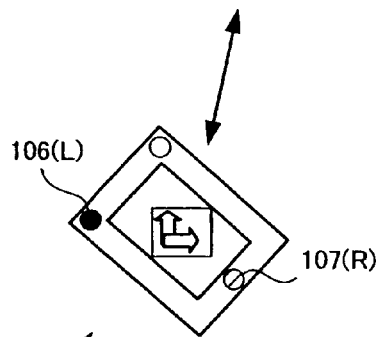
FIG. 8F    FIG. 8D
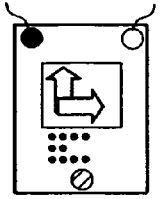
FIG. 8E

PERSONAL DIGITAL ASSISTANT AND STEREO REPRODUCTION METHOD

CROSS-REFERENCE TO RELATED APPLICATION

This application is based upon and claims the benefit of priority from the prior Japanese Patent Application No. 2004-366422, filed Dec. 17, 2004, the entire contents of which is incorporated herein by reference.

BACKGROUND OF THE INVENTION

1. Field of the Invention

The present invention relates to a personal digital assistant and stereo reproduction method.

2. Description of the Related Art

In personal digital assistants having a stereo sound reproduction function, the stereo sound reproduction speakers are set as adjacent speakers on two opposing corner portions of the display screen. The speakers which reproduce each channel of stereo sound are switched as being observed from the display screen corresponding to whether the display screen is used in a portrait or landscape style. A personal digital assistant which reproduces the left channel by a speaker situated on the left and reproduces the right channel by a speaker situated on the right has been proposed (for example, as disclosed in Japanese Laid-Open (Kokai) Patent Application No. 2003-078601 titled "PORTABLE TERMINAL").

Apart from that, assumed from the conventional prior art mentioned above, the personal digital assistant has a stereo sound reproduction function provided in a foldable structure consisting of an operation section housing and a display section housing. Accordingly, stereo sound reproduction is performed from the left and right of the display in cases where in an opened state oriented horizontally (with the display section housing on the left side and the operation section housing on the right side-or-the display section housing on the right side and the operation section housing on the left side) or in cases where in an opened state oriented vertically (with the display section housing on the upper side and the operation section housing on the lower side). However, there is no reference relative to stereo sound reproduction in cases where the display section housing is oriented in a diagonal state (oblique position).

SUMMARY OF THE INVENTION

The object of the present invention is to provide a personal digital assistant, a stereo reproduction method and a stereo reproduction program which can achieve optimum stereo sound reproduction even when the display section housing is inclined at any angle relative to the operation section housing.

In order to achieve the above-mentioned object, the personal digital assistant according to the present invention is provided with a display section housing having a display means and an operation section housing having a key input means connected by a rotatable hinge means, wherein the display section housing rotates relative to the operation section housing with the rotatable hinge means serving as a central rotational axis, comprising a plurality of speakers arranged surrounding the display means; a detection means for detecting the rotation angle of the display section housing relative to the operation section housing; a speaker identifier means for identifying a speaker situated on the leftmost side relative to a display image displayed on the display means and a speaker situated on the rightmost side relative to a display image displayed on the display means among the plurality of speakers based on the rotation angle of the display section housing detected by the detection means; and a sound reproduction control means for reproducing stereo sound with the speaker situated on the leftmost side and the speaker situated on the rightmost side identified by the speaker identifier means.

Also, in order to achieve the above-mentioned object, a stereo reproduction method in a personal digital assistant is provided with a display section housing having a display means and an operation section housing having a key input means connected by a rotatable hinge means, wherein the display section housing rotates relative to the operation section housing with the rotatable hinge means serving as a central rotational axis, comprising the steps of detecting the rotation angle of the display section housing relative to the operation section housing; identifying a speaker situated on the leftmost side relative to a display image displayed on the display means and a speaker situated on the rightmost side relative to a display image displayed on the display means from among a plurality of speakers arranged surrounding the display means based on the detected rotation angle of the display section housing; and reproducing stereo sound with the speaker situated on the leftmost side and the speaker situated on the rightmost side.

Also, in order to achieve the above-mentioned object, a program documentation recording medium for storing a stereo reproduction program executed by a processor which reproduces stereo sound in a personal digital assistant is provided with a display section housing having a display means and an operation section housing having a key input means connected by a rotatable hinge means, wherein the display section housing rotates relative to the operation section housing with the rotatable hinge means serving as a central rotational axis, comprising the steps of detecting the rotation angle of the display section housing relative to the operation section housing; identifying a speaker situated on the leftmost side relative to a display image displayed on the display means and a speaker situated on the rightmost side relative to a display image displayed on the display means from among a plurality of speakers arranged surrounding the display means based on the detected rotation angle of the display section housing; and reproducing stereo sound with the speaker situated on the leftmost side and the speaker situated on the rightmost side.

According to the present invention, the advantage obtained is that optimum stereo sound reproduction can be achieved even when the display section housing is inclined at any angle.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 4 is a conceptual drawing showing the assignment of the left and right speakers according to the first embodiment;

FIGS. 8A~8H are illustrations showing the manner in which the stereo sound is precisely reproduced when a display 104 is rotated according to the third embodiment.

DETAILED DESCRIPTION OF THE PREFERRED EMBODIMENTS

Hereinafter, the preferred embodiments of the present invention will be explained with reference to the drawings. In the first preferred embodiment of the personal digital assistant provided with a rotatable hinge, the method of reproducing stereo sound precisely at any angle of the rotatable hinge will be explained.

A. First Embodiment

A-1. Construction of the First Embodiment

Figure 1:
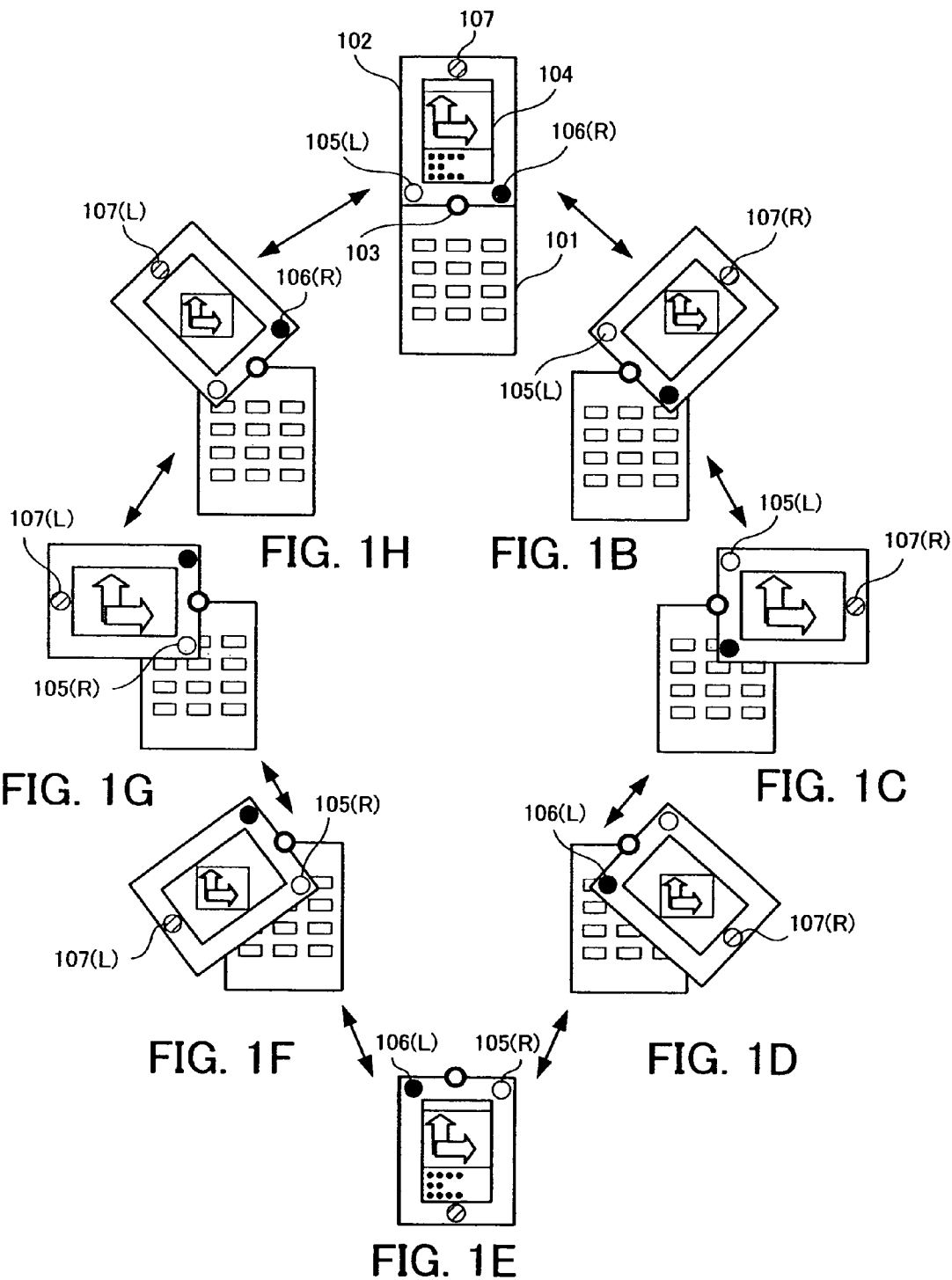
FIGS. 1A~1H are illustrations showing a state in which stereo sound is precisely output according to the rotation angle of the display section housing relative to the operation section housing of a personal digital assistant 200 according to the first embodiment of the present invention.

FIG. 1 is an illustration showing a state in which stereo sound is output precisely according to the rotation angle of a display section housing relative to an operation section housing of a personal digital assistant 200 (hereafter, simply referred to as personal digital assistant 200) with a stereo sound reproduction function according to the first embodiment. The personal digital assistant 200 according to the first embodiment is provided with a structure wherein the operation section housing 101 and the display section housing 102 are connected by a rotatable hinge 103. In this structure, the display section housing 102 rotates relative to the operation section housing 101 with the rotatable hinge 103 serving as the central rotational axis as shown in FIG. 1A through FIG. 1H.

The personal digital assistant 200 rotates on the rotatable hinge 103 which serves as the central rotational axis from FIG. 1A to FIG. 1B (where the display 104 is inclined diagonally), then rotates sequentially with FIG. 1C and FIG. 1D, and in FIG. 1E becomes a state whereby the operation section housing 101 and the display section housing 102 overlap. The display section housing can be completely revolved relative to the operation section housing 101 as shown in FIG. 1F, FIG. 1G, FIG. 1H and FIG. 1A.

The display section housing 102 of the personal digital assistant 200 of the present invention is provided with a display 104 and three built-in speakers 105, 106 and 107. The speaker 105 is located in the lower left side of the display 104, the speaker 106 to the lower right side of the display 104 and the speaker 107 upper side of the display 104, respectively. The operation section housing 101 is provided with an operations unit 209 for receiving operational instructions from the user.

Figure 2:
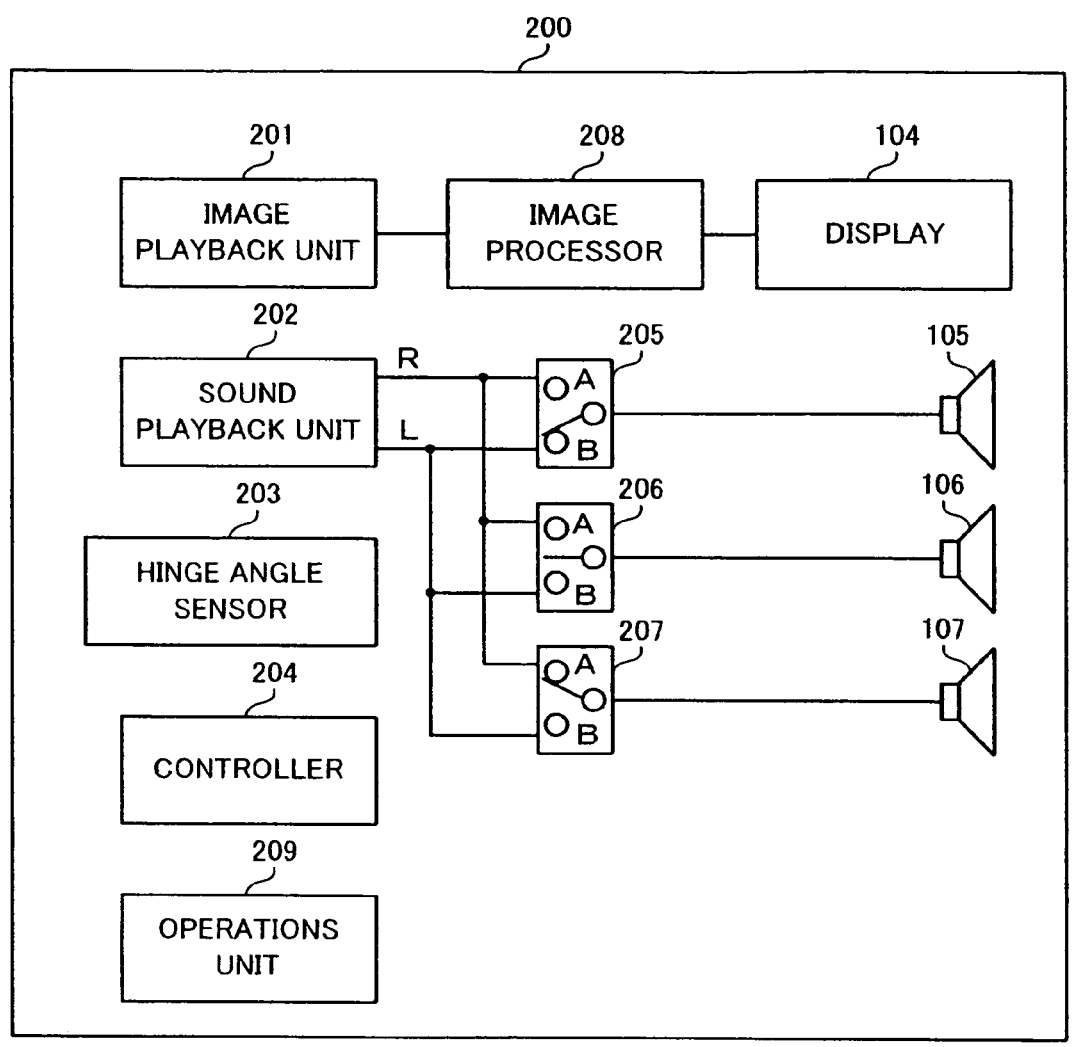
FIG. 2 is a block diagram showing the outline construction of a personal digital assistant with a stereo sound reproduction function according to the first embodiment.

Next, FIG. 2 is a block diagram showing the outline construction of a personal digital assistant with a stereo sound reproduction function according to the first embodiment of the present invention. In FIG. 2, the personal digital assistant 200 is composed of an image playback unit 201, a sound playback unit 202, a hinge angle sensor 203, a controller 204, a first switch 205, a second switch 206, a third switch 207, an image processor 208, a display 104, three speakers 105, 106, and 107 and the operations unit 209.

The controller 204 reads image data and sound data from memory not shown in the diagram, outputs the image data to the image playback unit 201 and outputs the sound data to the sound playback unit 202. The image playback unit 201 plays back the image data and image output from the image playback unit 201 is supplied to the image processor 208. The image processor 208 processes (resizes, rotates) the image data according to the angle of the display section housing 102 relative to the operation section housing 101 detected by the hinge angle sensor 203 so that the image to be displayed on the display 104 stands upright.

The sound playback unit 202 plays back stereo sound wherein right (R) component sound output from the sound playback unit 202 is supplied to speaker 105 (the speaker located in one of the rotatable hinge 103 side positions of the display section housing 102) via the first sound switch 205, speaker 106 (the speaker located in the other of the rotatable hinge 103 side positions of the display section housing 102) via the second sound switch 206 and speaker 107 (the speaker located in the approximate center in the opposite side of the rotatable hinge 103 side of the display section housing 102) via the third sound switch 207.

In the same manner, left (L) component sound output form the sound playback unit 202 is supplied to speaker 105 via the first sound switch 205, speaker 106 via the second sound switch 206 and speaker 107 via the third sound switch 207. The first sound switch 205, second sound switch 206 and third sound switch 207 are switch controlled by the controller 204. Basically, speaker 105 outputs the left (L) component sound and speaker 106 outputs the right (R) component sound in the state referenced in FIG. 1A.

The hinge angle sensor 203 detects the angle of the rotatable hinge 103, namely, the angle of the display section housing 102 relative to the operation section housing 101. The controller 204 identifies the speaker located on the rightmost side and the speaker located on the leftmost side of the upright image displayed on the display 104 among speakers 105, 106 and 107 according to the detection results of the hinge angle sensor 203. It then controls switching the first switch 205, the second switch 206 and the third switch 207 so that the stereo sound right audio is output from the speaker located on the rightmost side and the left audio from the speaker located on the leftmost side.

Also, the controller 204 receives operations (instructions, character input operation, etc. to the personal digital assistant 200) according to the user from the operations unit 209 and accomplishes control corresponding to the operations.

A-2. Operation of the First Embodiment

Figure 3:
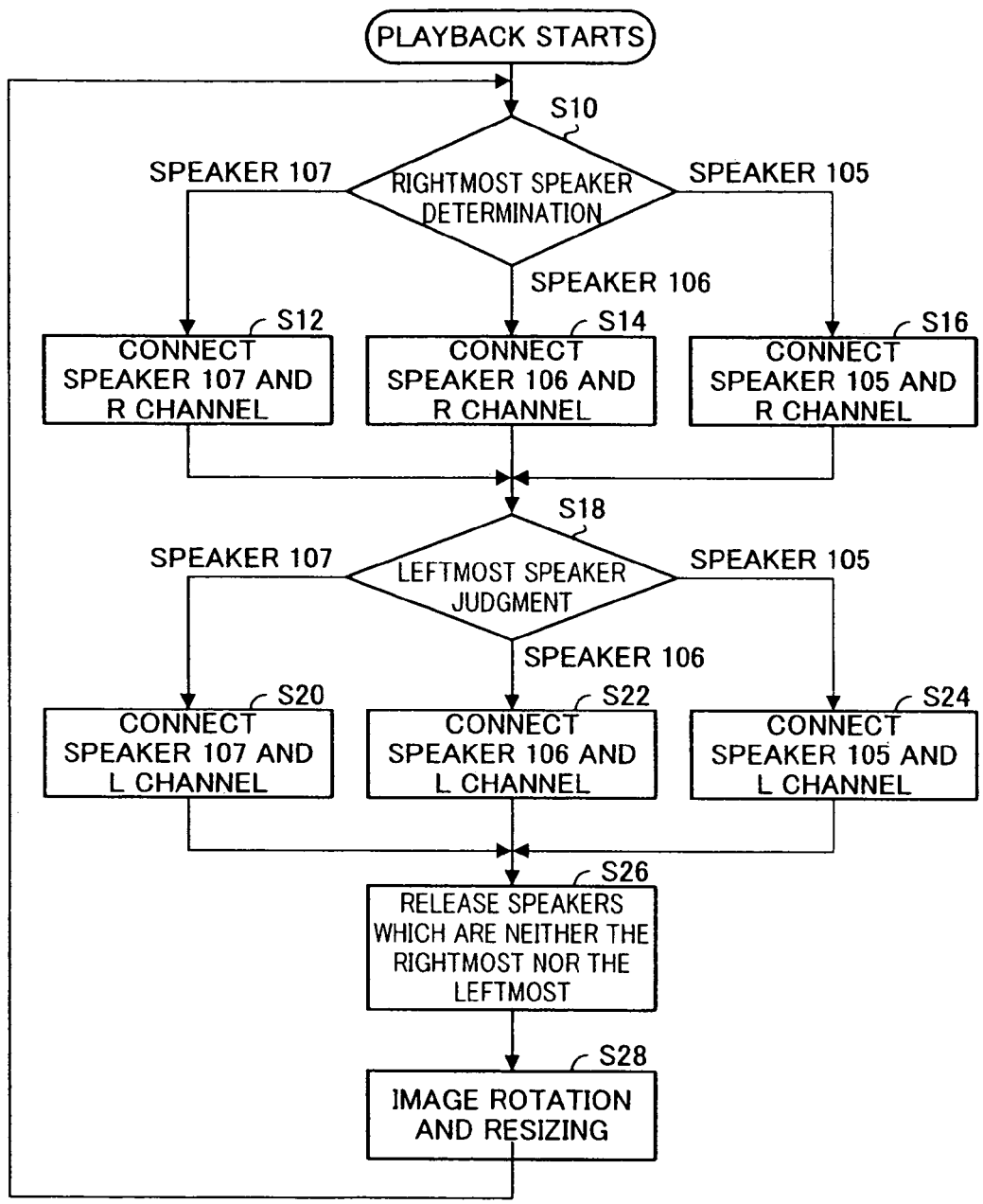
FIG. 3 is a flow chart for explaining the operation of a personal digital assistant 200 according to the first embodiment example.

The operation of the second embodiment is explained next. Here, FIG. 3 is a flow chart for explaining the operation of the personal digital assistant 200 according to the first embodiment. Once playback is started, the controller 204 detects the angle of the display section housing 102 relative to the operation section housing 101 from the hinge angle sensor 203 and makes a determination according to the detection results as to which of the speakers 105, 106 or 107 becomes the rightmost speaker viewed from the user when the user picks up the operation section housing 101 (Step S10).

As an example of this determination method, the relationship among the fixing position, the length of each edge and the rotational angle of the display section housing 102, the operation section housing 101, the rotatable hinge 103, the speaker 105, the speaker 106 and the speaker 107 is calculated. When the display housing 102 relative to the operation section housing 101 becomes whichever angle, a preliminary calculation is accomplished to determine which the rightmost speaker.

For example, in any state of FIG. 1B, FIG. 1C or FIG. 1D, the speaker 107 is determined to be the rightmost speaker. In such case, the controller 204 controls the third sound switch 207 so that the right audio (R-channel) output of the sound playback unit 202 is supplied to the speaker 107 (Step S12). Also, for example, in either state of FIG. 1H or 1A, the speaker 106 is determined to be the rightmost speaker. In such case, the controller 204 controls the second sound switch 206 so that the right audio (R-channel) output of the sound playback unit 202 is supplied to the speaker 106 (Step S14). Also, for example, in any state of FIG. 1E, FIG. 1F or FIG. 1G, the speaker 105 is determined to be the rightmost speaker. In such case, the controller 204 controls the first sound switch 205 so that the right audio (R-channel) output of the sound playback unit 202 is supplied to the speaker 105 (Step S16).

Next, it is judged according to the detection result by the hinge angle sensor 203 which one of the speakers 105, 106 or 107 is to become the leftmost speaker as viewed from the user (the speaker located on the leftmost position of the upright image displayed on the display 104) (Step S18).

For example, in any state of FIG. 1F, FIG. 1G or FIG. 1, the speaker 107 is determined to be the leftmost speaker. In such case, the controller 204 controls the third sound switch 207 so that the left audio (L-channel) output of the sound playback unit 202 is supplied to speaker 107 (Step S20). Also, for example, in either state of FIG. 1D or FIG. 1E, the speaker 106 is determined to be the leftmost speaker. In such case, the controller 204 controls the second sound switch 206 so that the left audio (L-channel) output of the sound playback unit 202 is supplied to speaker 106 (Step S22). Also, for example, in any state of FIG. 1A, FIG. 1B, or FIG. 1C, the speaker 105 is determined to be the leftmost speaker. In such case, the controller 204 controls the first sound switch 205 so that the left audio (R-channel) output of the sound playback unit 202 is supplied to speaker 105 (Step S24).

Next, as the output of the sound playback unit 202 is not supplied to a speaker (whichever of the speakers 105, 106, or 107) which is not selected in either the rightmost speaker determination (Step S10) or in the leftmost speaker determination (Step S18), the controller 204 controls the first sound switch 205, the second sound switch 206 and the third sound switch to release the applicable speaker (Step S26).

Furthermore, according to the detection results from the hinge angle sensor 203, the image processor 208 applies rotation and resizing (changing the size of the displayed image) to the image output according to the image playback unit 201 (Step S28). For example, in the state shown in FIG. 1B, the image output is rotated by the image playback unit 201 to align in the upward direction of the image displayed on the display 104 and the upward direction of the operation section housing 101 so that the displayed image of the display screen (screen of display 104) stands upright when the user holds the operation section housing 101 by the hand and further resizes it so that the entire image can be displayed on the display 104. Namely, in the state in FIG. 1B, the image is rotated 45 degrees in an anticlockwise direction in comparison to the state of the image in FIG. 1A and is resized into a size that can be displayed on the display.

Also, in FIG. 1C, FIG. 1G or at an angle not shown in any of the diagrams, there are times when there are determined to be two rightmost or leftmost speakers. In such cases, the connection in the state prior to the determination that there are two rightmost or leftmost speakers may be retained. For example, whereas the left audio (L-channel) is output from the speaker 105 when rotated from that shown in FIG. 1B to FIG. 1C, it may be arranged so that the left audio (L-channel) is output from the speaker 106 when rotated from FIG. 1D to FIG. 1C unlike the change from FIG. 1B to FIG. 1C. Thus, changes in the output speakers can be reduced so as not to give discomfort to the user.

Here, FIG. 4 is a conceptual drawing showing the assignment of the left and right speakers in this first embodiment described above. The cases of outputting the left audio (L channel) from the speaker 105 are FIG. 1A, FIG. 1B and FIG. 1C. The cases of outputting the right audio (R channel) from the speaker 105 are FIG. 1E, FIG. 1F and FIG. 1G. Also, the cases outputting the left audio (L channel) from the speaker 106 are FIG. 1D and FIG. 1E. The cases of outputting the right audio (R channel) from the speaker 106 are FIG. 1A and FIG. 1H. Also, the cases of outputting the left audio (L channel) from the speaker 107 are FIG. 1F, FIG. 1G and FIG. 1H. The cases of outputting the right audio (R channel) from the speaker 107 are FIG. 1B, FIG. 1C and FIG. 1D.

Note that an explanation was provided using rotation angles in the 45-degree unit in this first embodiment and angles may be those in the middle of rotation between the two. At angles in the middle of rotation, it may be arranged so that no speaker switching is performed by minute changes to prevent frequent changes near the angle where speakers are switched. Therefore, speaker switching is performed only when a change beyond a certain angle has occurred.

Also, although an example of the operation section housing 101 and the display section housing 102 rotating horizontally by 360 degrees is stated in this first embodiment, the present invention is not limited to this structure. What is necessary is that the structure of the display section housing 102 has the display 104 and the built-in three speakers (speaker 105, speaker 106 and speaker 107) which rotate when viewed from the user side. Moreover, a foldable structure is also feasible.

Also, in the image processor 208, the figures or objects in the display image may be maintained at a fixed size by not resizing and performing rotation only. Further, in the image processor 208, rotation and resizing of the displayed image may not be performed either. However, audio is controlled to reproduce stereo sound. Also, switching of the speakers may be achieved with user instructions from the operations unit 209.

According to the first embodiment described above, even if the user centrally rotates the operation section housing 101 and the display section housing 102 on the rotatable hinge 103, the right stereo sound can be played back from the right side of the upright image displayed on the display 104 and the left stereo sound from the left side of the upright displayed image. This allows the user to listen in the reception style of a user's preference and the user's convenience can be enhanced.

B. Second Embodiment

Next, the second embodiment of the present invention will be explained. In the second preferred embodiment which is set to the personal digital assistant according to the first embodiment shown in FIGS. 1A~1H, the acoustic image localization of the output audio from the speakers is controlled in a state when the terminal is rotated so that the right audio is heard from the right of the screen, the left audio from the left of the screen and the central audio from the middle of the screen.

Figure 5:
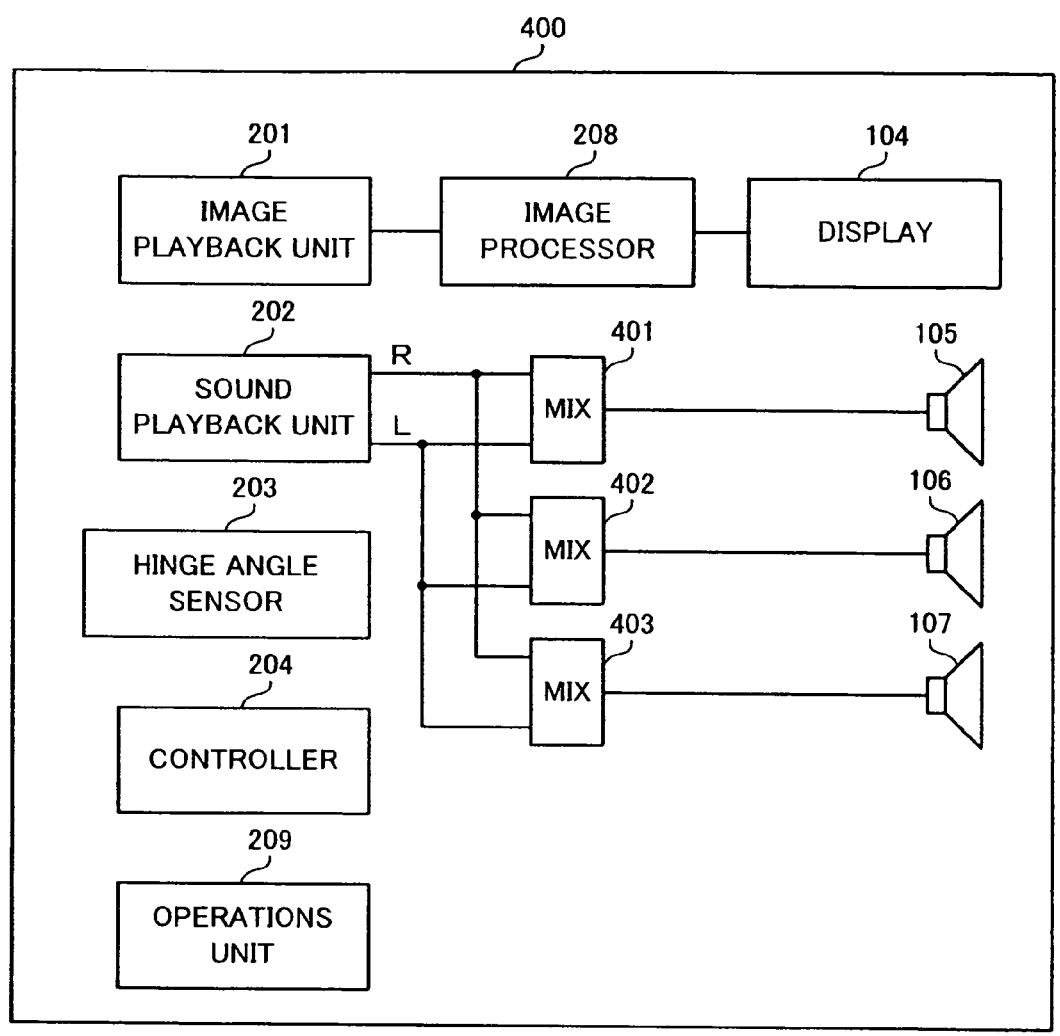
FIG. 5 is a block diagram showing the construction of a personal digital assistant 400 according to the second embodiment of the present invention.

FIG. 5 is a block diagram showing the construction of a personal digital assistant 400 according to the second embodiment. As shown in FIG. 5, in the second embodiment, the sound switches (the first sound switch 205, the second sound switch 206 and the third sound switch 207) which merely switches the LR signals is relocated with the mixers (a first mixer 401, a second mixer 402 and a third mixer 403 corresponding to the switches) which optionally mix the LR signals in the construction of the first embodiment. Elements corresponding to those in FIG. 2 are assigned the same nomenclature and explanation is omitted.

Figure 6:
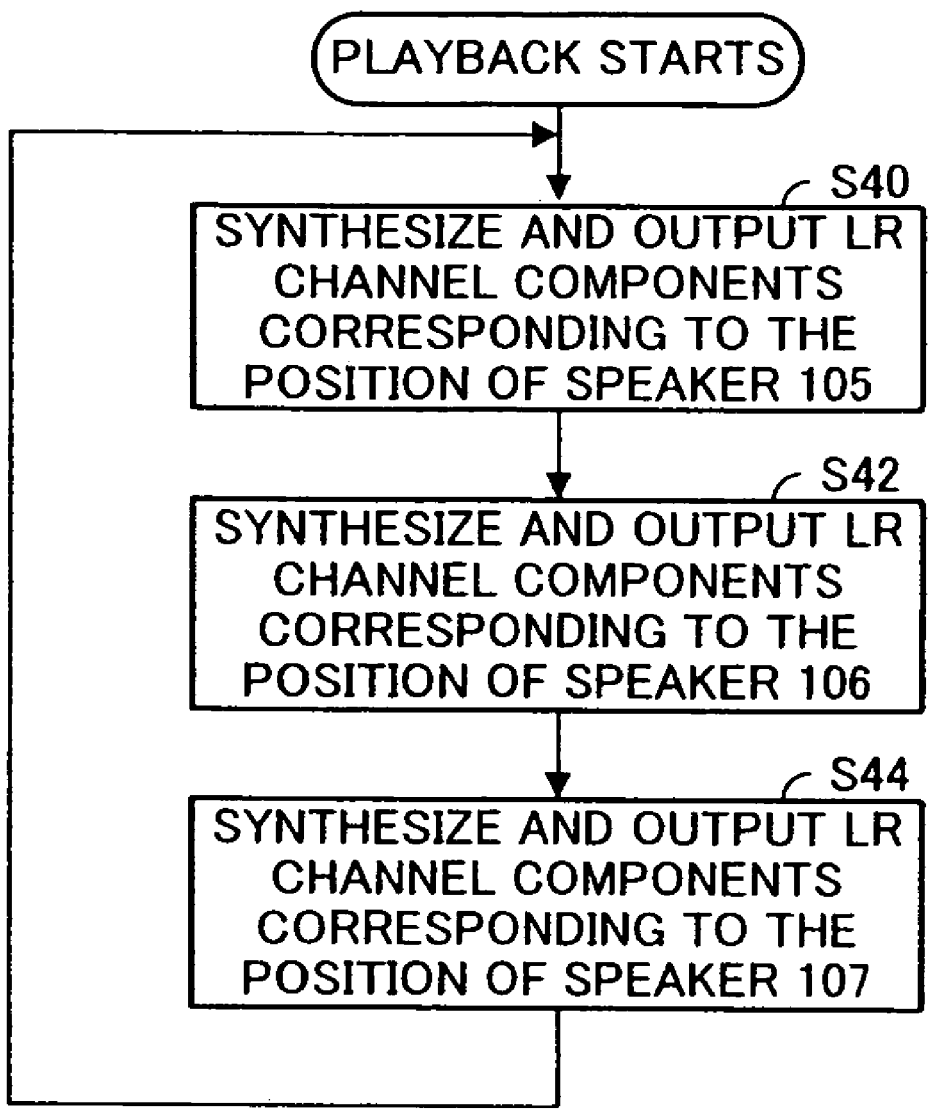
FIG. 6 is a flow chart for explaining the operation of a personal digital assistant 400 according to the second embodiment.

FIG. 6 is a flow chart which explains the operation of the personal digital assistant 400 according to the second embodiment. Explained in the flow chart is a procedure for stereo sound reproduction for precisely performing acoustic image localization in the case where the display section housing 102 of the personal digital assistant 400 is rotated relative to the operation section housing 101 with the rotatable hinge 103 serving as the rotation axis at the time of image playback.

When playback is started, the hinge angle sensor 203 detects the current hinge angle which is supplied to the controller 204. The controller 204 synthesizes the right audio signal and the left audio signal in the first mixer 401 so that audio corresponding to the position of the speaker 105 can be output from the speaker 105 (Step S40). In the same manner, the right audio signal and the left audio signal are synthesized in the second mixer 402 so that audio corresponding to the position of the speaker 106 can be output from the speaker 106 (Step S42). Also, the right audio signal and the left audio signal are synthesized in the same manner in the third mixer 403 so that audio corresponding to the position of the speaker 107 can be output from the speaker 107 (Step S44).

As an example of the synthesis, in the state of FIG. 1A, the first mixer 401 is controlled so that only the left audio signal of 100% strength is output to the speaker 105 (Step S40) The second mixer 402 is controlled so that only the right audio signal of 100% strength is output to the speaker 106 (Step S42). Then, the third mixer 403 is controlled so that neither the left audio signal nor the right audio signal is output from the speaker 107 (Step S44).

Also, in the state of FIG. 1C, the first mixer 401 is controlled so that a left audio signal of 50% strength and a right audio signal of 0% strength are added and output to the speaker 105 (Step S40). The second mixer 402 is controlled so that a left audio signal of 50% strength and a right audio signal of 0% strength are added and output to the speaker 106 (Step S42). Furthermore, the third mixer 403 is controlled so that a left audio signal of 0% strength and a right audio signal of 100% strength are added and output to the speaker 107 (Step S44).

The state of FIG. 1B is an intermediate state relative to FIG. 1A and FIG. 1C, the first mixer 401, the second mixer 402, and the third mixer 403 output audio from the speaker 105, the speaker 106 and the speaker 107, respectively, so that the stereo sound can be precisely reproduced from the left and right of the display 104.

Below, the same applies to FIGS. 1B through 1H by controlling the first mixer 401, the second mixer 402, and the third mixer 403 corresponding to the positions of the speaker 105, the speaker 106 and the speaker 107 corresponding to the angle detected by the hinge angle sensor 203 and by controlling sound signals output to speaker 105, speaker 106 and speaker 107, respectively. In this manner, it becomes possible to control acoustic image localization so that the right audio can be heard from the right of the screen, the left audio from the left of the screen and the central audio from the middle of the screen at any angle.

Also, although an explanation was given in the explanation of acoustic image localization using an example of the strength of the audio signal, the present invention is not restricted to this. However, acoustic image localization may be controlled by performing phase control or delay time control of the signal. Also, acoustic image localization may be realized by a user's instructions from the operations unit 209.

According to the second embodiment, even if the user rotates the operation section housing 101 and the display section housing 102 centering on the rotatable hinge 103, the right audio of stereo sound can be reproduced from the right side of an upright image displayed on the display 104, the left sound from the left side of the upright image displayed on the display 104 and further the central audio from the middle of the upright image displayed on the display 104. This allows the user to listen in the reception style of a user's preference and the user's convenience can be enhanced.

C. Third Embodiment

Next, the third embodiment of the present invention will be explained.

C-1. Construction of the Third Embodiment

Figure 7:
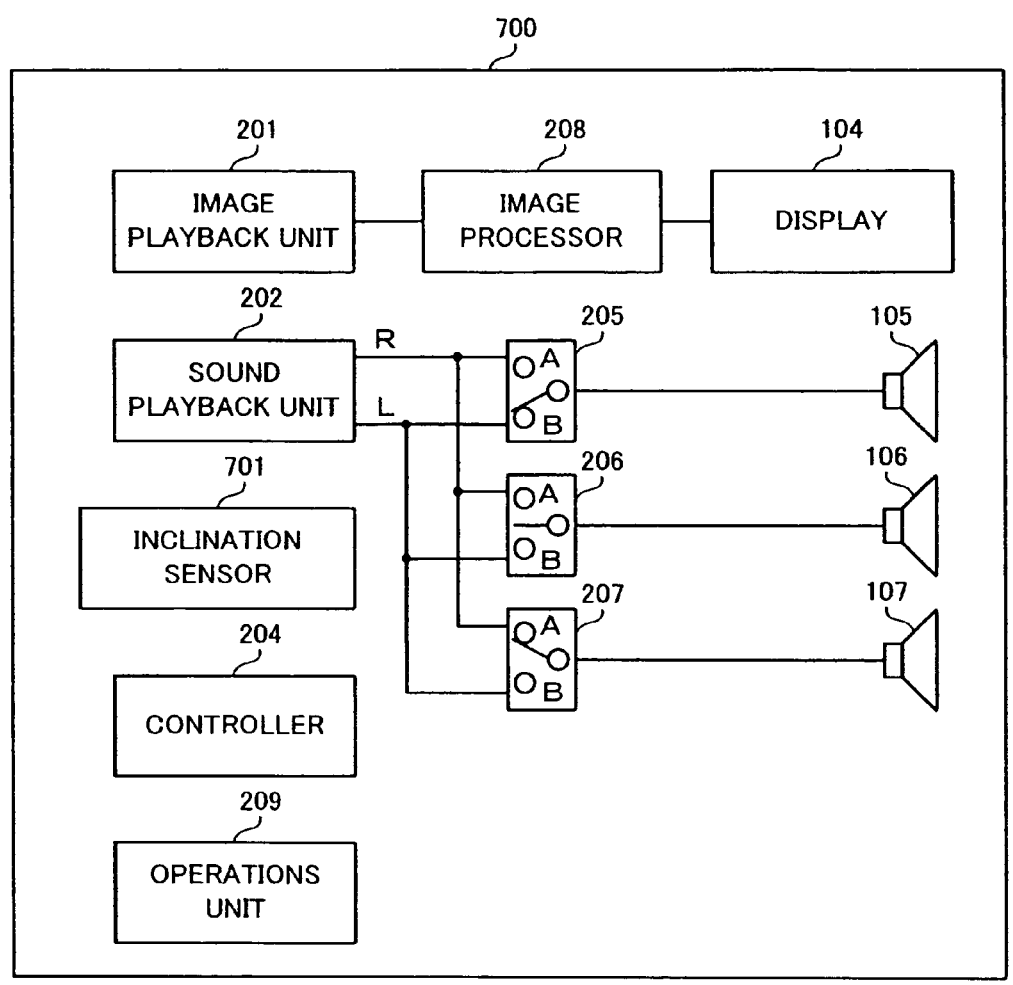
FIG. 7 is a block diagram showing the construction of a personal digital assistant 700 according to the third embodiment of the present invention.

FIG. 7 is a block diagram showing the construction of a personal digital assistant 700 according to the third embodiment. Elements corresponding to those in FIG. 2 are assigned the same nomenclature and explanation is omitted. In the diagram, an inclination sensor 701 replaces the hinge angle sensor 203 in the first embodiment and detects the angle of the display 104 relative to a horizontal plane. This third embodiment detects the angle at which the display 104 is oriented according to the inclination sensor 701 and precisely reproduces stereo sound corresponding to this inclination angle.

C-2. Operation of the Third Embodiment

Next, the operation of the third embodiment will be explained. Here, FIG. 8A through FIG. 8H are illustrations showing the manner in which the stereo sound is precisely reproduced when the display 104 is rotated in this third embodiment. The operation of this third embodiment is the same as that in the flow chart shown in FIG. 3 of the first embodiment, except that the judgment factor of the rightmost speaker determination (Step S10) and the leftmost speaker determination (Step S18) has been changed from the detection results of the hinge angle sensor 203 to the detection results of the inclination sensor 701.

Although FIG. 8A through FIG. 8H show and explain only the display 104, as shown in FIG. 1A to FIG. 1H of the first embodiment, the operation section housing 101 is attached and may form any angle. Also, a foldable structure is also feasible.

Furthermore, acoustic image localization may be controlled using the first mixer 401, the second mixer 402 and the third mixer 403 of the second embodiment in place of the first sound switch 205, the second sound switch 206 and the third sound switch 207. Also, switching the speakers may be realized according to the user's instructions from the operations unit 209.

According to the third embodiment, the right audio stereo audio can be reproduced from the right side of an upright image displayed on the display 104 and the left audio can be reproduced from the left side of the upright image displayed on the display 104. This allows the user to listen in the reception style of a user's preference and the user's convenience can be enhanced.

Although an example of using three speakers of 105, 106, and 107 was explained in the first through third embodiment examples, the present invention is not limited to this. The present invention may be realized with four speakers located in each of the four corners or four edges of the display 104. Alternatively, there can be even more than four speakers. By using four or more speakers, reproducibility of stereo sound can be further improved over that of stereo reproduction with three speakers.

While the present invention has been described with reference to the preferred embodiments, it is intended that the invention be not limited by any of the details of the description therein but includes all the embodiments which fall within the scope of the appended claims.

What is claimed is:

1. A personal digital assistant provided with a display section housing having a display means and an operation section housing having a key input means connected by a rotatable hinge means, wherein the display section housing rotates relative to the operation section housing with the rotatable hinge means providing a central rotational axis, comprising:
    a plurality of speakers arranged surrounding the display means;
    a detection means for detecting an arbitrary position of the display section housing;
    a speaker identifier means for identifying a speaker situated on a leftmost side relative to a display image displayed on the display means and a speaker situated on a rightmost side relative to the display image displayed on the display means among said plural speakers based on the position of the display section housing detected by the detection means, the leftmost and rightmost sides being identified on a two-dimensional plane including the arbitrary position of the display section; and
    a sound reproduction control means for reproducing stereo sound with the speaker situated on the leftmost side and the speaker situated on the rightmost side identified by the speaker identifier means;
    wherein the speaker identifier means identifies the speaker situated on the leftmost side and the speaker situated on the rightmost side based on a current position of the display section and an immediately previous position of the display section detected by the detection means.

2. The personal digital assistant according to claim 1, further comprising an audio output switching means for switching output of stereo sound left audio and right audio relative to the plurality of speakers, respectively; and
    wherein the sound reproduction control means reproduces stereo sound left audio output from the speaker situated on the leftmost side and stereo sound right audio output from the speaker situated on the rightmost side by controlling a switching operation according to the audio output switching means.

3. The personal digital assistant according to claim 1, further comprising:
    a mixing means for mixing and supplying stereo sound of the left audio and right audio relative to the plurality of speakers, respectively; and
    wherein the sound reproduction control means reproduces stereo sound left audio output from the speaker situated on the leftmost side and stereo sound right audio output from the speaker situated on the rightmost side by controlling a mixture ratio according to the mixing means based on the position of the display section housing detected by the detection means.

4. The personal digital assistant according to claim 1, wherein the position comprises an angle of the display section housing relative to the operation section housing.

5. The personal digital assistant according to claim 1, wherein the position comprises an inclination of the display section housing relative to a horizontal plane.

6. The personal digital assistant according to claim 1, further comprising:
    an image processing means for processing the display image so that the display image displayed on the display means stands upright based on the position of the display housing detected by the detection means.

7. The personal digital assistant according to claim 1, wherein the plurality of speakers have a first speaker situated on a lower end portion left side of the display means, a second speaker situated on a lower end portion right side of the display means and a third speaker situated on an upper end middle portion of the display means.

8. The personal digital assistant according to claim 1, wherein the plurality of speakers have a first speaker, a second speaker, a third speaker and a fourth speaker respectively situated near the four corners of the display means.

9. A stereo reproduction method in a personal digital assistant provided with a display section housing having a display means and an operation section housing having a key input means connected by a rotatable hinge means, wherein the display section housing rotates relative to the operation section housing with the rotatable hinge means providing a central rotational axis, the method comprising the steps of:
    detecting an arbitrary position of the display section housing;
    identifying a speaker situated on a leftmost side relative to a display image displayed on the display means and a speaker situated on the rightmost side relative to a display image displayed on the display means from among a plurality of speakers arranged surrounding the display means based on a current position of the display section and an immediately previous detected position of the display section, the leftmost and rightmost sides being identified on a two-dimensional plane including the arbitrary position of the display section; and
    reproducing stereo sound with the speaker situated on the leftmost side and the speaker situated on the rightmost side.

10. The stereo reproduction method according to claim 9, wherein stereo sound is reproduced by left audio outputted from the speaker situated on the leftmost side and by right audio output from the speaker situated on the rightmost side by switching control of an output for the stereo sound left audio and right audio relative to the plurality of speakers, respectively.

11. The stereo reproduction method according to claim 9, wherein the stereo sound is reproduced by the speaker situated on the leftmost side and the speaker situated on the rightmost side by controlling a mixture ratio of the stereo sound left audio and right audio relative to the plurality of speakers, respectively, based on the position of the display section housing.

12. The stereo reproduction method according to claim 9, wherein the position comprises an inclination of the display section housing relative to the operation section housing.

13. The stereo reproduction method according to claim 9, wherein the position comprises an inclination of the display section housing relative to a horizontal plane.

14. The stereo reproduction method according to claim 9, wherein the display image is processed so that the display image displayed on the display means stands upright based on the position of the display housing.

15. A program documentation recording medium for storing a stereo reproduction computer program on a processor, which when used on a personal digital assistant provided with a display section housing having a display means and an operation section housing having a key input means connected by a rotatable hinge means causes stereo reproduction of stereo sound, wherein the display section housing rotates relative to the operation section housing with the rotatable hinge means providing a central rotational axis, the stereo reproduction computer program comprising:

program code for detecting an arbitrary position of the display section housing;

program code for identifying a speaker situated on a leftmost side relative to a display image displayed on the display means and a speaker situated on a rightmost side relative to the display image displayed on the display means from among a plurality of speakers arranged surrounding the display means based on a current position of the display section and an immediately previous detected position of the display section, the leftmost and rightmost sides being identified on a two-dimensional plane including the arbitrary position of the display section; and program code for reproducing the stereo sound with the speaker situated on the leftmost side and the speaker situated on the rightmost side.

16. The program documentation recording medium according to claim 15, wherein the stereo sound is reproduced by outputting left audio from the speaker situated on the leftmost side and outputting right audio from the speaker situated on the rightmost side by switching control of the output for the stereo sound left audio and right audio relative to the plurality of speakers, respectively.

17. The program documentation recording medium according to claim 15, wherein the stereo sound is reproduced by the speaker situated on the leftmost side and by the speaker situated on the rightmost side by controlling a mixture ratio of the stereo sound left audio and right audio relative to the plurality of speakers, respectively, based on the position of the display section housing.

* * * * *